(12) United States Patent
Funaoka et al.

(10) Patent No.: US 7,876,804 B2
(45) Date of Patent: Jan. 25, 2011

(54) LASER OSCILLATOR

(75) Inventors: Koji Funaoka, Tokyo (JP); Masahiko Hasegawa, Tokyo (JP); Yasunari Matsumoto, Tokyo (JP); Motoaki Tamaya, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 0 days.

(21) Appl. No.: 12/522,834

(22) PCT Filed: Apr. 20, 2007

(86) PCT No.: PCT/JP2007/058626
§ 371 (c)(1),
(2), (4) Date: Jul. 10, 2009

(87) PCT Pub. No.: WO2008/136073
PCT Pub. Date: Nov. 13, 2008

(65) Prior Publication Data
US 2010/0135343 A1    Jun. 3, 2010

(51) Int. Cl.
*H01S 3/22*    (2006.01)
*H01S 3/03*    (2006.01)
*H01S 3/08*    (2006.01)

(52) U.S. Cl. .................. 372/107; 372/55; 372/65
(58) Field of Classification Search .......... 372/55, 372/65, 107
See application file for complete search history.

(56) References Cited

U.S. PATENT DOCUMENTS

2003/0193985 A1    10/2003    Hare et al.

FOREIGN PATENT DOCUMENTS

| JP | 60-254684 A | 12/1985 |
| JP | 6-308420 A | 11/1994 |
| JP | 9-23034 A | 1/1997 |
| JP | 9-271968 A | 10/1997 |
| JP | 2000-183425 A | 6/2000 |
| JP | 2002-316291 A | 10/2002 |
| JP | 2004-342966 A | 12/2004 |

OTHER PUBLICATIONS

International Search Report (PCT/ISA/210) for PCT/JP2007/058626 completed May 23, 2007.

*Primary Examiner*—Armando Rodriguez
(74) *Attorney, Agent, or Firm*—Buchanan Ingersoll & Rooney PC (57) ABSTRACT

A first optical base having a high-reflection mirror and a second optical base having a partial-reflection mirror are arranged in parallel to each other on both sides of an oscillator housing. A guide light source emits a guide light for aligning optical components in an optical path of a laser light emitted from an optical resonator and adjusting a processing point on a target object. An optical-component supporting unit includes optical components that guide the laser light in a direction perpendicular to an optical axis of the optical resonator. The guide light source is arranged on the second optical base.

7 Claims, 5 Drawing Sheets

LASER OSCILLATOR

TECHNICAL FIELD

The present invention relates to a laser oscillator used in, for example, a laser processing apparatus.

BACKGROUND ART

Typically, a laser oscillator includes a housing in which a pair of discharging electrodes are arranged and a laser medium gas is filled and an optical resonator that is arranged at both sides parallel to the discharging surface of the housing. The housing includes the discharging electrodes as a pair of plate-like electrode materials arranged apart by a predetermined distance, a blower that circulates the laser medium gas inside the housing, and a cooling unit that cools the laser medium gas that has reached a high temperature due to the electric discharge from the discharging electrodes. The gaps between the discharging electrodes and the cooling unit are connected by a duct.

In the optical resonator, a first optical base and a second optical base are arranged parallel to each other by, for example, three supporting rods, two in the upper part and one in the lower part, over both sides parallel to the discharging surface of the housing. A total reflecting mirror is fixed on the first optical base. A partial reflecting mirror is fixed on the second optical base facing the total reflecting mirror. The direction in which the optical resonator resonates a laser light is hereinafter referred to as an optical axis. The gap within a laser light passing portion between the housing and each optical base of the optical resonator is connected by a bellows.

Given below is the description of an outline of the working of such a laser oscillator. When a high voltage is applied to the discharging electrodes, an electric discharge occurs between the discharging electrodes thereby causing an excitation of the laser medium gas between the discharging electrodes. A light generated due to the excitation of the laser medium gas is resonated by resonant mirrors. The laser light reflected at the total reflecting mirror supported on the first optical base reaches the partial reflecting mirror supported on the second optical base. Subsequently, some portion of the laser light is output as it is to the outside of the laser oscillator and the remaining portion of the laser light is reflected toward the total reflecting mirror supported on the first optical base. At that time, the excited laser medium gas between the discharging electrodes passes through the duct and circulates in the cooling unit. After the cooling unit cools the excited laser medium gas, the blower re-circulates the cooled laser medium gas to the discharging electrodes.

In the case of a laser oscillator used for a processing having a high output power, the amount of generated heat is large and a local temperature difference occurs in the circulating laser medium gas, which causes a thermal deformation of the housing. Moreover, the supporting rods of the optical resonator also undergo a thermal deformation following the housing. As a result, the tilt of the optical bases with respect to the supporting rods (positional relation between the pair of optical bases) is changed from the state at the time of installation. That causes a fluctuation in the temporal stability with respect to the output direction of the laser light position. To solve such a problem, conventionally, a configuration has been proposed in which the central portions in the axis direction of two supporting rods arranged in the upper part of a housing from among the supporting rods of an optical oscillator are attached to the top surface of the housing, a supporting rod on a side having less thermal deformation is fixedly attached to the housing, and other supporting rod is movably attached with only the movement in the axis direction and the height direction restricted (for example, see Patent Literature 1).

According to the method disclosed in Patent Literature 1, it is possible to suppress a change in the positional relation between the pair of optical bases when a local temperature difference occurs in the laser medium gas circulating in the housing. However, because the thermal deformation of the housing causes a change in the position or the angle of both end faces, the positions of the bellows arranged on both sides with respect to an optical axis direction of the housing changes. The reaction force generated due to the change of positions of the bellows affects the positional relation between the two optical bases. To solve such a problem, conventionally, a configuration has been proposed in which the side edge portion of the housing and the optical bases are coupled with a leaf spring in such that the housing and the optical bases are restricted from making a curved motion in a direction perpendicular to the optical axis and a rotational motion about the optical axis but allowed to make a curved motion along the axis direction and a rotational motion about the axis in a direction perpendicular to the optical axis (for example, see Patent Literature 2). Taking such a configuration, the alignment change of the optical resonator is suppressed to the minimum.

Meanwhile, in a laser processing apparatus, the laser light output from a laser oscillator is guided to a processing point through a plurality of deflecting mirrors. Typically, the laser light output from a laser oscillator includes a linearly-polarized optical component. The rate of absorption of the laser light with respect to a target object differs according to the processing direction due to the linearly-polarized optical component. That causes an anisotropy in processing quality. Usually, to prevent the anisotropy in processing quality, a conventional technology takes a configuration in which a circularly-polarizing mirror is arranged between the laser oscillator and the deflecting mirrors for converting the laser light emitted by the laser oscillator into a circularly-polarized light (for example, see Patent Literature 3).

To convert the linearly-polarized laser light output from the laser oscillator into a circularly-polarized light, a mirror can be arranged such that, with respect to a reflecting surface of the mirror with an incidence angle of 45° and at an incidence arrangement where a polarization plane of the linearly-polarized laser light makes an angle of 45° (angle of orientation of 45°) with an S-polarized optical axis (or a P-polarized optical axis), a phase difference of 90° ($\lambda/4$) occurs between an S-polarized component and a P-polarized component of the reflected laser light. Thus, a dielectric multilayer mirror of optical film design meant to cause the phase difference of 90° ($\lambda/4$) between the S-polarized component and the P-polarized component of the reflected laser light is known as the circularly-polarizing mirror. The S-polarized component is a component having a polarization plane perpendicular to an incidence plane and the P-polarized component is a component having a polarization plane perpendicular to the polarization plane of the S-polarized component, i.e., parallel to the incidence plane.

Moreover, regarding a laser processing apparatus, a conventional configuration is also known in which optical components for performing a processing-point check or an optical-path alignment are arranged inside a laser oscillator. In that configuration, the laser oscillator further includes a guide light source that emits a guide light, an optical shutter that blocks the laser light emitted inside an optical resonator at the time of determining stains on or misalignment of a resonant mirror or an external deflecting mirror, and an optical damper that absorbs the laser light reflected at the optical shutter.

Moreover, because it is necessary to cool the optical damper or the mirrors, an exit optical path unit made of the optical shutter or the circularly-polarizing mirror has a heavy structure and is fixed to a housing or a mount beneath the housing (for example, see Patent Literature 4). Furthermore, a guide light generating unit constructed of a guide light source and a deflecting mirror is fixed on the outside of a supporting frame in which an oscillator housing including an optical resonator is fixed (for example, see Patent Literature 5).

Patent Literature 1: Japanese Patent Application Laid-open No. 2000-183425

Patent Literature 2: Japanese Patent Application Laid-open No. 2003-304015

Patent Literature 3: Japanese Patent Application Laid-open No. 2002-316291

Patent Literature 4: Japanese Patent Application Laid-open No. H09-271968

Patent Literature 5: Japanese Patent Application Laid-open No. H09-23034

DISCLOSURE OF INVENTION

Problem to be Solved by the Invention

However, for example, when laser oscillators described in Patent Literatures 2 to 5 are combined, a thermal deformation of the housing leads to a thermal deformation of a mount or a supporting frame used to fix the housing. Consequently, the position of the guide light source or the deflecting mirror changes and causes a change in the optical axis of the guide light.

The laser light and the guide light guided up to a processing head via a plurality of mirrors pass through a thin nozzle of the processing head and fall onto a target object. At that time, if the optical axis of the guide light undergoes a substantial change due to the deformation of the mount or the supporting base, the laser light or the guide light gets blocked at the nozzle and the guide light used for processing-point check is lost to sight.

Moreover, to reduce the change of the optical axis, it is necessary to have a heavy structure for the mount or the supporting base such that the deformation of the housing does not affect the mount. However, such a configuration results in a substantial increase in the manufacturing cost of the laser oscillator or the laser processing apparatus.

The present invention has been made to solve the above problems in the conventional technology and it is an object of the present invention to provide a laser oscillator that includes an optical system for processing-point check or optical path alignment and that can be manufactured without increasing the manufacturing cost such that the deformation of the housing does not affect the optical axis of the guide light.

Means for Solving Problem

To achieve the object, a laser oscillator according to the present invention includes an oscillator housing; a pair of optical bases that are arranged on both sides of the oscillator housing and mutually connected in parallel with three supporting rods extending along an optical axis direction and that support optical components constituting an optical resonator; a pair of bellows that connect gaps between the pair of optical bases and the oscillator housing; a leaf spring that maintains the pair of optical bases hanging from the oscillator housing; a guide light source that emits a guide light for aligning optical components in an optical path from a partial reflecting mirror that emits a laser light to a processing head that illuminates a target object with the laser light and adjusting a processing point; and an optical-component supporting unit that includes optical components that guide the laser light in the optical path from the partial reflecting mirror to the processing head in a direction parallel to a lateral surface of the oscillator housing on which the optical base is arranged. The guide light source is arranged on an optical base that includes the partial reflecting mirror.

Effect of the Invention

According to an aspect of the present invention, even if a housing undergoes thermal deformation, the change in position of an optical base fixed with three supporting rods is small. Consequently, the change in the emission direction of a guide light emitted from a guide light source arranged on an optical base is not substantial thereby preventing change in the optical axis of the guide light. That enables to enhance a processing accuracy with the use of a laser light emitted from a laser oscillator.

| EXPLANATIONS OF LETTERS OR NUMERALS | |
|---|---|
| 1 | laser oscillator |
| 10 | housing |
| 20 | optical resonator |
| 21 | first optical base |
| 22 | second optical base |
| 23 | partial reflecting mirror |
| 24, 25, 26 | supporting rods |
| 27 | guide light source |
| 31 | coupling member |
| 40 | optical-component supporting unit |
| 41 | component installation unit |
| 42 | supporting unit |
| 51 | circularly-polarizing mirror |
| 52, 54, 56 | deflecting block |
| 53 | deflecting mirror |
| 55 | guide-light deflecting mirror |
| 57 | optical damper |
| 58 | movable stage |
| 59 | air cylinder |
| 60 | piston rod |
| 61 | fixing face |
| 62 | protrusion |
| 63 | fixing member |
| 71 | mount |

BEST MODE(S) FOR CARRYING OUT THE INVENTION

Exemplary embodiments for a laser oscillator according to the present invention will be described below in detail with reference to the accompanying drawings. The present invention is not limited to the embodiments described below.

First Embodiment

Figure 1:
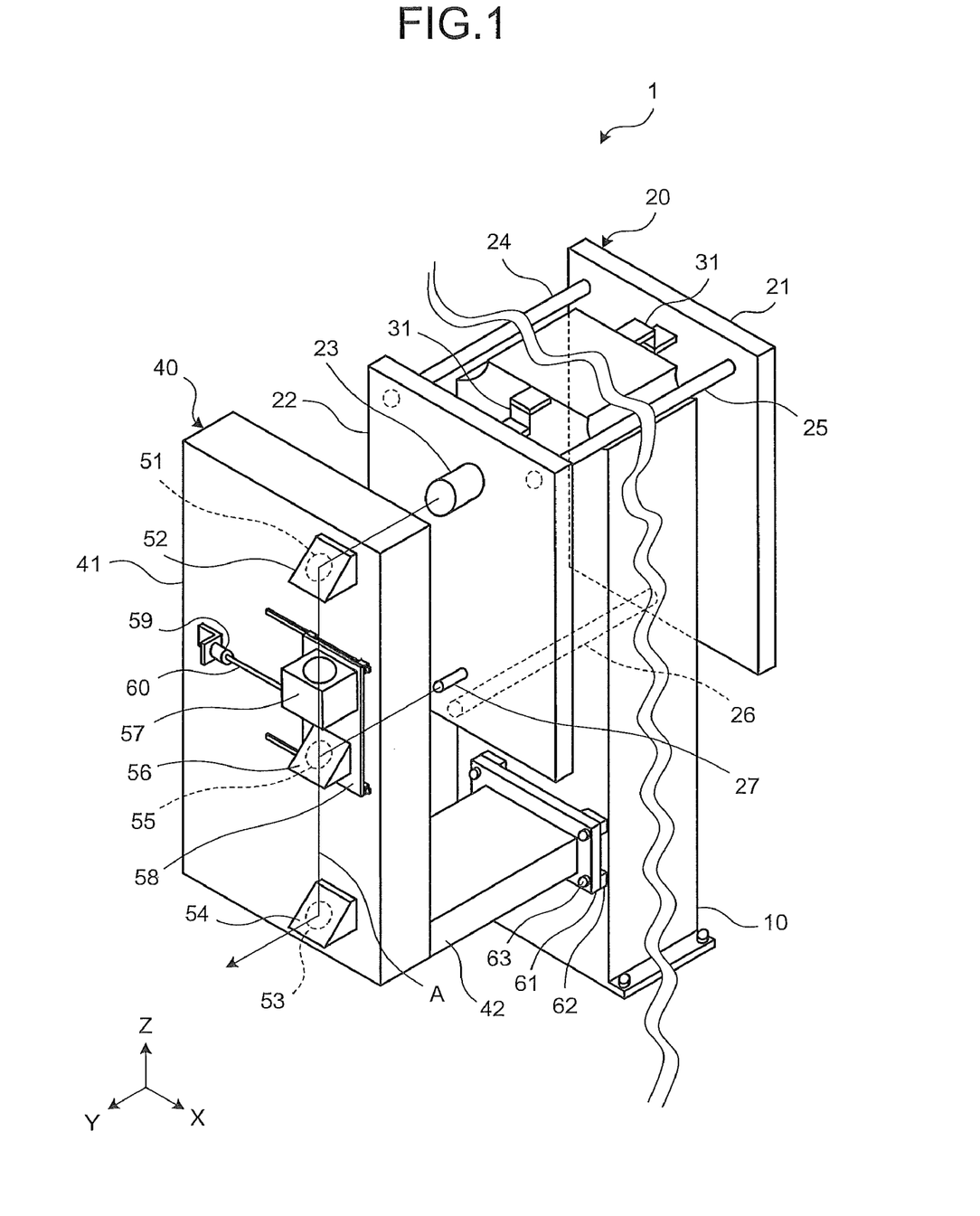
FIG. 1 is a perspective view of a configuration of essential parts of a laser oscillator according to a first embodiment of the present invention.
Figure 2:
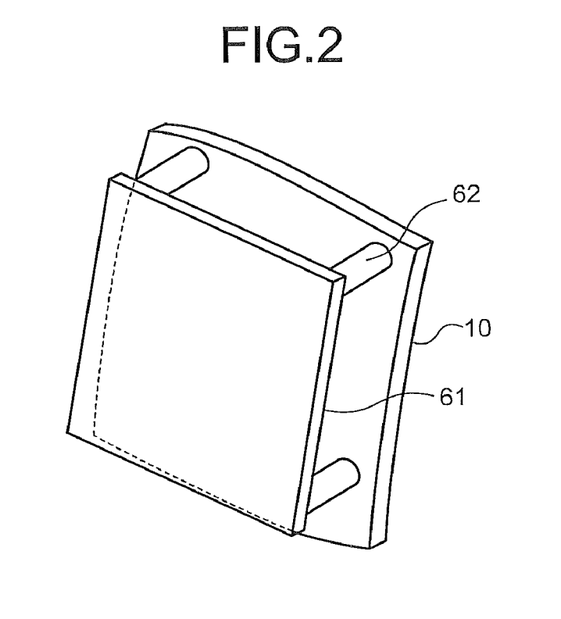
FIG. 2 is a perspective view for explaining fixing of an optical-component supporting unit to a housing with a fixing member.
Figure 3:
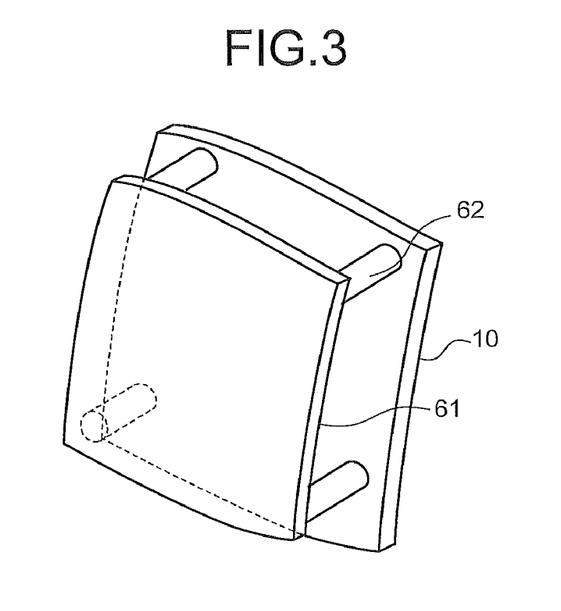
FIG. 3 is a perspective view for explaining fixing, not according the first embodiment, of an optical-component supporting unit to a housing with a fixing member.
Figure 4:
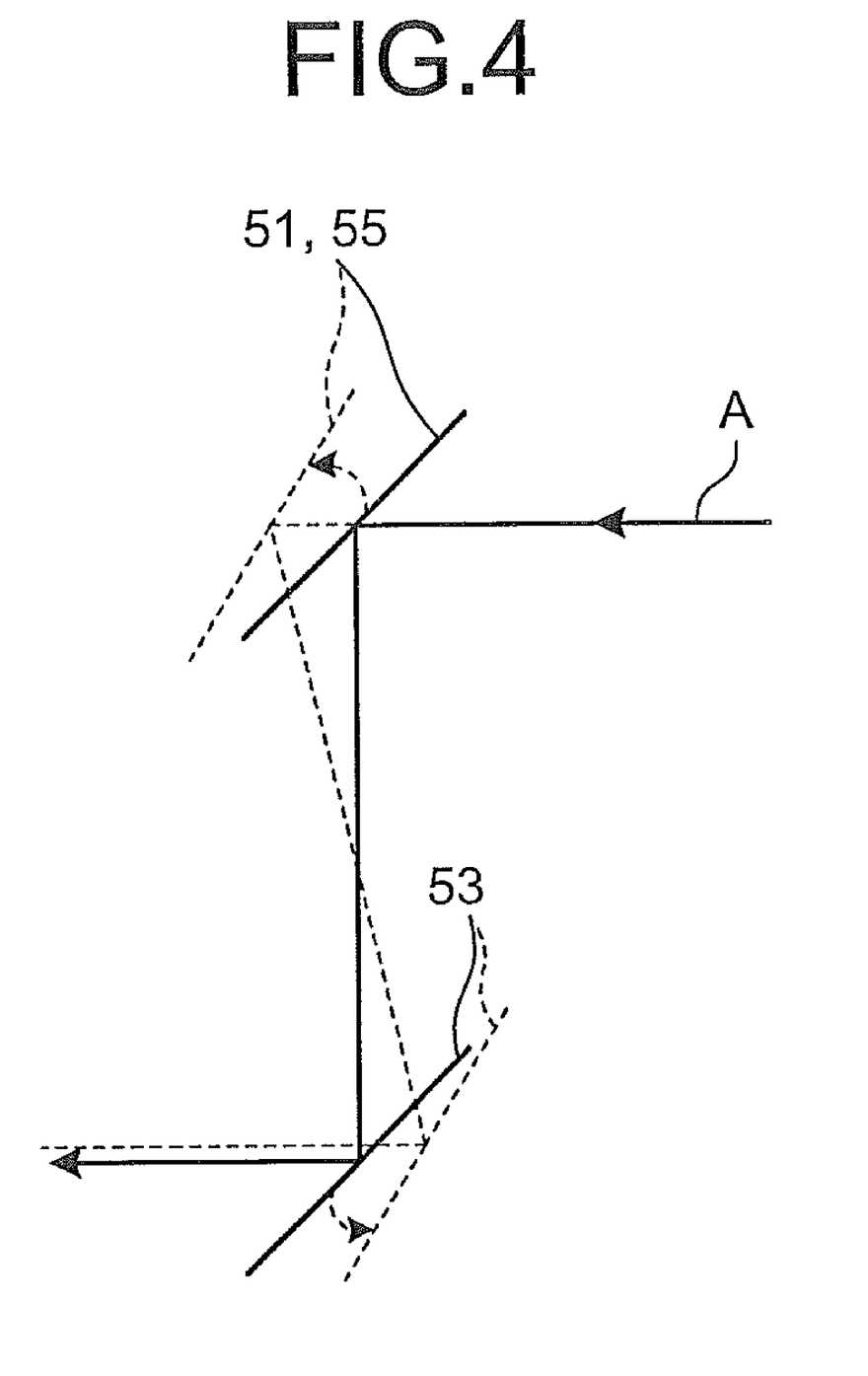
FIG. 4 is a cross-sectional view schematically illustrating an alignment relation of a mirror according to thermal deformation of the optical-component supporting unit.

FIG. 1 is a perspective view of a configuration of essential parts of a laser oscillator according to a first embodiment of the present invention. FIG. 2 is a perspective view for explaining fixing of an optical-component supporting unit to a housing with a fixing member. FIG. 3 is a perspective view for explaining fixing, not according the first embodiment, of an optical-component supporting unit to a housing with a fixing member. FIG. 4 is a cross-sectional view schematically illustrating an alignment relation of a mirror according to thermal deformation of the optical-component supporting unit. Meanwhile, in the following description, the axis direction of a laser light in an optical resonator is assumed to be the Y-axis, the height direction perpendicular to the Y-axis is assumed to be the Z-axis, and the direction perpendicular to the Y-axis and the Z-axis is assumed to be the X-axis.

A laser oscillator 1 includes a housing 10 in which a pair of discharging electrodes is arranged and a laser medium gas is filled and an optical resonator 20 that is arranged over both sides parallel to the discharging surface of the housing 10. The housing 10 includes, although not shown, the discharging electrodes as a pair of plate-like electrode materials arranged apart by a predetermined distance, a cooling unit that cools the laser medium gas that has reached a high temperature due to the electric discharge from the discharging electrodes, a blower that circulates the laser medium gas inside the housing, a duct that connects the discharging electrodes and the cooling unit, and a blower that circulates the laser medium gas inside the housing 10. The housing 10 corresponds to an oscillator housing in claims.

In the optical resonator 20, a first optical base 21 and a second optical base 22 are arranged parallel to each other by, for example, three supporting rods 24 to 26, two in the upper part and one in the lower part, on both sides along the discharging surface of the housing 10. A total reflecting mirror, not shown, is supportably fixed on the first optical base 21. A partial reflecting mirror 23 is supportably fixed on the second optical base 22 and arranged facing the total reflecting mirror. The direction in which the optical resonator 20 resonates a laser light is the optical axis. Moreover, although not shown, the gap within a laser light passing portion between the first optical base 21 of the optical resonator 20 and the housing 10 and between the second optical base 22 of the optical resonator 20 and the housing 10 is connected by a bellows.

According to the first embodiment, a guide light source 27 that emits a guide light, which is used for processing-point check or optical path alignment, is arranged below the partial reflecting mirror 23 of the second optical base 22. The guide light source 27 can be, for example, a red laser diode and emits a guide light in the direction parallel to the optical axis of the optical resonator 20.

A coupling member 31 such as a leaf spring is used to couple the end of the housing 10 on the side of the first optical base 21 with the first optical base 21 and couple the end of the housing 10 on the side of the second optical base 22 with the second optical base 22. Because of the coupling member 31, the optical resonator 20 is maintained hanging from the housing 10. At that time, with respect to the center positions of the bellows connected to the housing 10, the center positions of the bellows connected to the first optical base 21 and the second optical base 22 restrict the degree of freedom in the X-axis direction and the Z-axis direction as well as in the rotation direction about the Y-axis direction. Other than that, the degree of freedom in the Y-axis direction as well as the rotation direction about the X-axis and the Z-axis is maintained movable.

Because the housing 10 is coupled with the first optical base 21 and the second optical base 22 by using the coupling member 31, the optical resonator 20, on the one hand, has a deformation resistant structure with respect to a bending in the X-axis direction or the Z-axis direction and has high rigidity with respect to the rotation direction around the Y-axis. On the other hand, the optical resonator 20 has an easily deformable structure with respect to a bending in the Y-axis direction and with respect to the rotation direction about the X-axis or the Z-axis.

An optical-component supporting unit 40 is arranged on the lateral surface of the housing 10 on the laser light output side (on the side of the partial reflecting mirror 23). The optical-component supporting unit 40 guides the laser light output from the partial reflecting mirror 23 toward a processing head, not shown, and is equipped with optical components used for processing-point check or optical path alignment. Moreover, the optical-component supporting unit 40 has an L-shaped cross section structure and includes a component installation unit 41 and a supporting unit 42. The component installation unit 41 is parallel to the lateral surface of the housing 10 on the laser light output side and has the optical components installed thereon. The supporting unit 42 is attached to the lower end of the component installation unit 41 along the optical axis.

On the component installation unit 41 are arranged deflecting blocks 52 and 54 that respectively include a circularly-polarizing mirror 51 and a deflecting mirror 53 used to guide the laser light output from the optical resonator 20 to the processing head. The circularly-polarizing mirror 51 is arranged to convert the linearly-polarized laser light emitted from the optical resonator 20 into a circularly-polarized laser light and reflect the circularly-polarized laser light downward in the Z-axis direction. The circularly-polarizing mirror 51 is fixed to the component installation unit 41 with the deflecting block 52. A hole is created at the installation position of the circularly-polarizing mirror 51 on the component installation unit 41 such that the laser light emitted from the optical resonator 20 falls on the circularly-polarizing mirror 51. The deflecting mirror 53 is arranged to reflect the circularly-polarized laser light from the circularly-polarizing mirror 51 toward the Y-axis direction and is fixed to the component installation unit 41 by the deflecting block 54.

On an optical path A between the circularly-polarizing mirror 51 and the deflecting mirror 53 is arranged a movable stage 58 to which a guide-light deflecting mirror 55 and an optical damper 57 are fixed. The movable stage 58 is attached to the tip of a piston rod 60 that is fixed to an air cylinder 59. Thus, the movable stage 58 is maintained movable over the component installation unit 41 in the X-axis direction. The guide-light deflecting mirror 55 is arranged in the optical path A between the circularly-polarizing mirror 51 and the deflecting mirror 53 such that the guide light emitted from the guide light source 27, which is arranged on the second optical base 22, is reflected downward in the Z-axis direction. The guide-light deflecting mirror 55 is fixed to the movable stage 58 with a deflecting block 56. A hole is created at the installation position of the guide-light deflecting mirror 55 on each of the component installation unit 41 and the movable stage 58 such that the guide light emitted from the guide light source 27 falls on the guide-light deflecting mirror 55 when the guide-light deflecting mirror 55 is arranged in the optical path A between the circularly-polarizing mirror 51 and the deflecting mirror 53. Moreover, when the guide-light deflecting mirror 55 is arranged in the optical path A between the circularly-polarizing mirror 51 and the deflecting mirror 53, the optical damper 57 absorbs the laser light emitted from the optical resonator 20 and functions as an open-close optical shutter for laser output. When the open-close optical shutter is in a closed state, the guide light emitted from the guide light source 27 is guided to the processing point through optical path A, which is the same optical path for the laser light emitted from the optical resonator 20, via the guide-light deflecting mirror 55.

When the guide-light deflecting mirror 55 is arranged in the optical path A between the circularly-polarizing mirror 51 and the deflecting mirror 53, the movable stage 58 enables to maintain a mutually parallel and collinear positional relation between the guide-light deflecting mirror 55, the circularly-polarizing mirror 51, and the deflecting mirror 53. Meanwhile, the circularly-polarizing mirror 51 corresponds to a first mirror in claims, the deflecting mirror 53 corresponds to a third mirror in claims, and the guide-light deflecting mirror 55 corresponds to a second mirror in claims.

The end of the supporting unit 42 on the opposite side of the component installation unit 41 is supportably fixed to the lateral surface of the housing 10 at three mutually non-collinear points. As shown in FIG. 1 or FIG. 2, the supporting unit 42 has a rectangular fixing face 61 at one end that is fixed to the housing 10. Three mutually non-collinear protrusions 62 are provided on the face of the supporting unit 42 that is opposite to the rectangular fixing face 61. In the example shown in FIG. 1 or FIG. 2, the protrusions 62 are provided at three out of four corners of the rectangular fixing face 61. The fixing face 61 is fixed to the housing 10 at the positions of the protrusions 62 by using fixing members 63 such as bolts.

Given below is the description of the working of the laser oscillator 1 having the abovementioned configuration. To perform a processing, the movable stage 58 on the component installation unit 41 of the optical-component supporting unit 40 is moved such that the guide-light deflecting mirror 55 and the optical damper 57 arranged on the movable stage 58 do not lie in the optical path A, which connects the circularly-polarizing mirror 51 and the deflecting mirror 53. That is, the movable stage 58 is moved to keep the optical shutter open and retract away the guide-light deflecting mirror 55 and the optical damper 57. In that condition, a part of the laser light emitted from the optical resonator 20 reflects from the partial reflecting mirror 23, which is arranged on the second optical base 22, and falls on the circularly-polarizing mirror 51. The circularly-polarizing mirror 51 converts the linearly-polarized laser light into a circularly-polarized light and deflects the optical path downward by 90° (downward in the Z-axis direction). Subsequently, the deflecting mirror 53 arranged at the lower end of the component installation unit 41 of the optical-component supporting unit 40 again deflects the optical path A in the Y-axis direction. The laser light is then guided to the processing head, not shown, and the processing is performed on a target object.

To perform processing-point check or optical path alignment, the movable stage 58 is moved such that the guide-light deflecting mirror 55 and the optical damper 57, which are arranged on the movable stage 58, lie in the optical path A that connects the circularly-polarizing mirror 51 and the deflecting mirror 53. That is, the movable stage 58 is moved to keep the optical shutter closed. As a result, the laser light emitted from the optical resonator 20 reflects from the partial reflecting mirror 23 and reflects downward in the Z-axis direction from the circularly-polarizing mirror 51 in an identical manner to the abovementioned case but thereafter gets absorbed by the optical damper 57. Thus, the laser light emitted from the optical resonator 20 does not reach the processing head.

In that condition, the guide light source 27 arranged on the second optical base 22 emits the guide light. The guide-light deflecting mirror 55 arranged on the movable stage 58 reflects the guide light downward in the Z-axis direction and the deflecting mirror 53 arranged at the lower end of the component installation unit 41 again deflects the optical path in the Y-axis direction. Subsequently, the guide light is guided to the processing head, not shown, and used for detecting processing point misalignment, stains on deflecting mirrors, or optical axis misalignment. Various adjustments are performed based on the detection result.

Given below is the description of operations in the laser oscillator 1 having the abovementioned configuration. When in operation, the housing 10 undergoes elongation in the optical axis direction (Y-axis direction) due to the heated laser medium gas and undergoes thermal deformation in a curved manner due to the temperature distribution of the laser medium gas. The thermal deformation of the housing 10 causes change in positions of the bellows arranged on both sides with respect to the optical axis direction of the housing 10. The reaction force generated due to the change in positions of the bellows causes deformation in the structure of the optical resonator 20 thereby affecting the positional relation between the first optical base 21 and the second optical base 22.

However, as described above, because the housing 10 is coupled at both ends with the first optical base 21 and the second optical base 22 by using the coupling member 31, it becomes possible to control the deformation of the first optical base 21 and the second optical base 22 occurring due to the thermal deformation of the housing 10 and control axial deformation of the first optical base 21 and the second optical base 22 occurring due to the change in positions of the bellows. Thus, the change in position of the optical resonator 20 is small thereby reducing the change in the emission direction of the guide light, which is emitted from the guide light source 27 arranged on the second optical base 22. Moreover, even if a slight change occurs in the position of the optical resonator 20, the difference in the emission direction of the laser light and the guide light is not substantial because the optical axis of the optical resonator 20 and the optical axis of the guide light move in the same direction.

Meanwhile, because the optical-component supporting unit 40 is fixed to the housing 10, the change in position of the optical-component supporting unit 40 due to thermal deformation of the housing is unavoidable. However, as shown in FIG. 4, even if the position of the optical-component supporting unit 40 changes, the angular change of the optical axis occurring on both mirrors of each of the guide-light deflecting mirror 55, the circularly-polarizing mirror 51, and the deflecting mirror 53 arranged in a mutually parallel and collinear manner gets balanced out such that the angle of the output optical axis remains the same. At that time, although the optical axis undergoes a slight parallel shift, it is possible to ignore that as compared with the angular change because the distance to the processing point is equal to or more than 10 m. Thus, according to the first embodiment, because each of the laser light and the guide light is output via a parallel mirror, the change in the optical axis of both lights is small. As a result, it becomes possible to perform high-accuracy processing when using the laser light and perform high-precise adjustment when using the guide light.

As described above, the effect of arranging the mirrors (the circularly-polarizing mirror 51, the deflecting mirror 53, and the guide-light deflecting mirror 55) in parallel on the component installation unit 41 of the optical-component supporting unit 40 is that there is no angular change in the optical axis even if the relative position of those mirrors fixed to the optical-component supporting unit 40 varies. Because of that, there is no need to fix the mirrors on a mount or a supporting base having a heavy structure. Moreover, as described in the first embodiment, by fixing the optical-component supporting unit 40 equipped with the mirrors directly to the housing 10, a mount or a supporting base is either no longer needed or simplified. That helps in keeping down the cost required to reduce changes in the optical axis.

Given below is the description regarding a three-point fixation mechanism used in fixing the optical-component supporting unit 40 to the housing 10. Assume that the fixing face 61 undergoes warpage due to thermal deformation of the housing 10. Then, in the case of a four-point fixation mechanism shown in FIG. 3, because the fixing face 61 is excessively constrained, a bending reaction force and a torsional reaction force acts on the optical-component supporting unit 40 thereby causing warpage. As a result, the relative angle of the circularly-polarizing mirror 51 and the deflecting mirror 53 or the relative angle of the guide-light deflecting mirror 55 and deflecting mirror 53 changes. Meanwhile, if more than four fixation points are used to fix the fixing face 61 of the optical-component supporting unit 40 to the housing 10, the fixing face 61 is further excessively constrained thereby causing deformation of the optical-component supporting unit 40 into a complicated shape. As a result, the relative angle of the circularly-polarizing mirror 51 and the deflecting mirror 53 or the relative angle of the guide-light deflecting mirror 55 and deflecting mirror 53 also changes.

On the contrary, consider the case as shown in FIG. 2 when a three-point fixation mechanism is used to fix the optical-component supporting unit 40 to the housing 10. In that case, even when the housing 10 undergoes thermal deformation, no bending reaction force or torsional reaction force acts on the optical-component supporting unit 40. As a result, it becomes possible to maintain a constant flatness for the optical-component supporting unit 40 and maintain a constant relative angle between the circularly-polarizing mirror 51 and the deflecting mirror 53 or a constant relative angle between the guide-light deflecting mirror 55 and deflecting mirror 53.

According to the first embodiment, the optical resonator 20 includes the first optical base 21 and the second optical base 22 fixed to each other with the three supporting rods 24 to 26. Moreover, the optical resonator 20 is coupled with the housing 10 by using the coupling member 31 such as a leaf spring. Thus, even if the housing 10 undergoes thermal deformation, the change in position of the first optical base 21 and the second optical base 22 is small. Consequently, the change in the emission direction of the guide light emitted from the guide light source 27, which is arranged on the second optical base 22, is not substantial thereby preventing change in the optical axis of the guide light. That enables to enhance processing accuracy with the use of the laser light emitted from the laser oscillator 1.

Moreover, even if the housing 10 undergoes thermal deformation during the laser oscillation operation, no bending reaction force or torsional reaction force acts on the optical-component supporting unit 40, which is equipped with the circularly-polarizing mirror 51 for guiding the laser light emitted from the optical resonator 20 or the guide-light deflecting mirror 55 and the deflecting mirror 53 for guiding the guide light emitted from the guide light source 27 to the processing head. As a result, it also becomes possible to maintain a constant relative angle between the circularly-polarizing mirror 51 and the deflecting mirror 53 or a constant relative angle between the guide-light deflecting mirror 55 and deflecting mirror 53. Moreover, that eliminates the need of fixing the optical-component supporting unit 40, which is equipped with optical components for processing-point check or optical path alignment, on a mount or a supporting base having a heavy structure that does not undergo deformation even if the housing 10 undergoes deformation. Thus, it becomes possible to manufacture the laser oscillator 1 without increasing the manufacturing cost in such a way that thermal deformation of the housing 10 does not affect the optical axis of the guide light.

Second Embodiment

Figure 5:
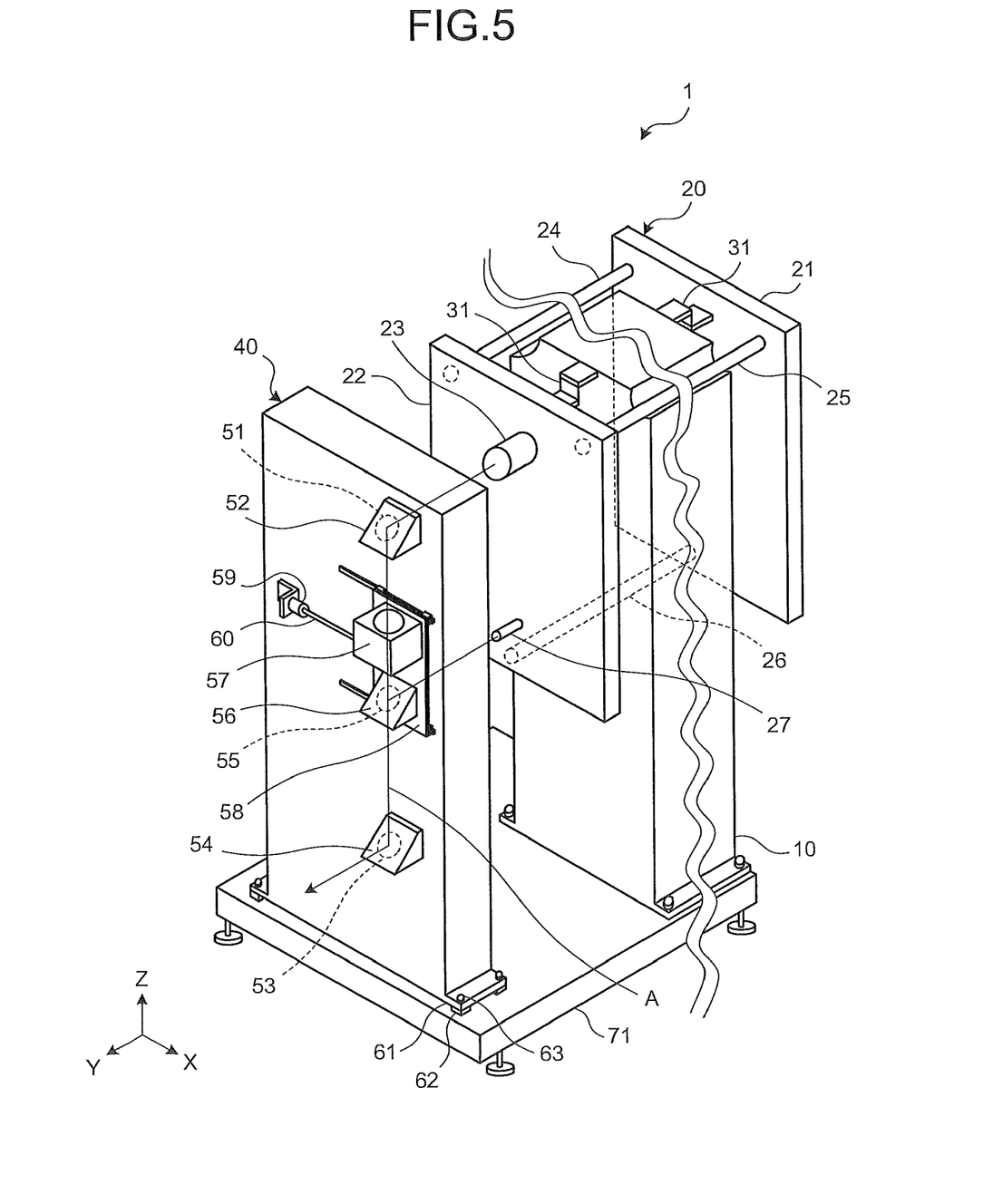
FIG. 5 is a perspective view of a configuration of essential parts of the laser oscillator according to a second embodiment of the present invention.

FIG. 5 is a perspective view of a configuration of essential parts of the laser oscillator according to a second embodiment of the present invention. In the laser oscillator 1 according to the second embodiment, the optical-component supporting unit 40 is not fixed to the housing 10 as described in the first embodiment with reference to FIG. 1. Instead, the optical-component supporting unit 40 is fixed to a mount 71 that supports the housing 10 from beneath. The optical-component supporting unit 40 has a flat plate-like shape and has the fixing face 61 at the lower end thereof. The three mutually non-collinear protrusions 62 protrude downward from the fixing face 61. The optical-component supporting unit 40 is supportably fixed to the mount 71 by clamping the protrusions 62 with the use of the fixing member 63 such as bolts. Meanwhile, the components in the second embodiment identical to those described in the first embodiment are referred to by the same reference numerals and their description is not repeated.

According to the second embodiment, if the housing 10 undergoes thermal deformation during the laser oscillation operation, the mount 71 also undergoes deformation thereby causing a change in the position of the optical-component supporting unit 40. However, by using a three-point fixation mechanism to fix the fixing face 61 of the optical-component supporting unit 40 to the mount 71, no bending reaction force or torsional reaction force acts on the optical-component supporting unit 40. As a result, it becomes possible to maintain a constant relative angle between the circularly-polarizing mirror 51 and the deflecting mirror 53 or a constant relative angle between the guide-light deflecting mirror 55 and deflecting mirror 53. That eliminates the need of having a heavy structure for the mount 71 to prevent deformation due to thermal deformation of the housing 10. Thus, as compared with a heavy structure of the mount 71, it becomes possible to keep down the manufacturing cost of the laser oscillator 1.

Third Embodiment

Figure 6:
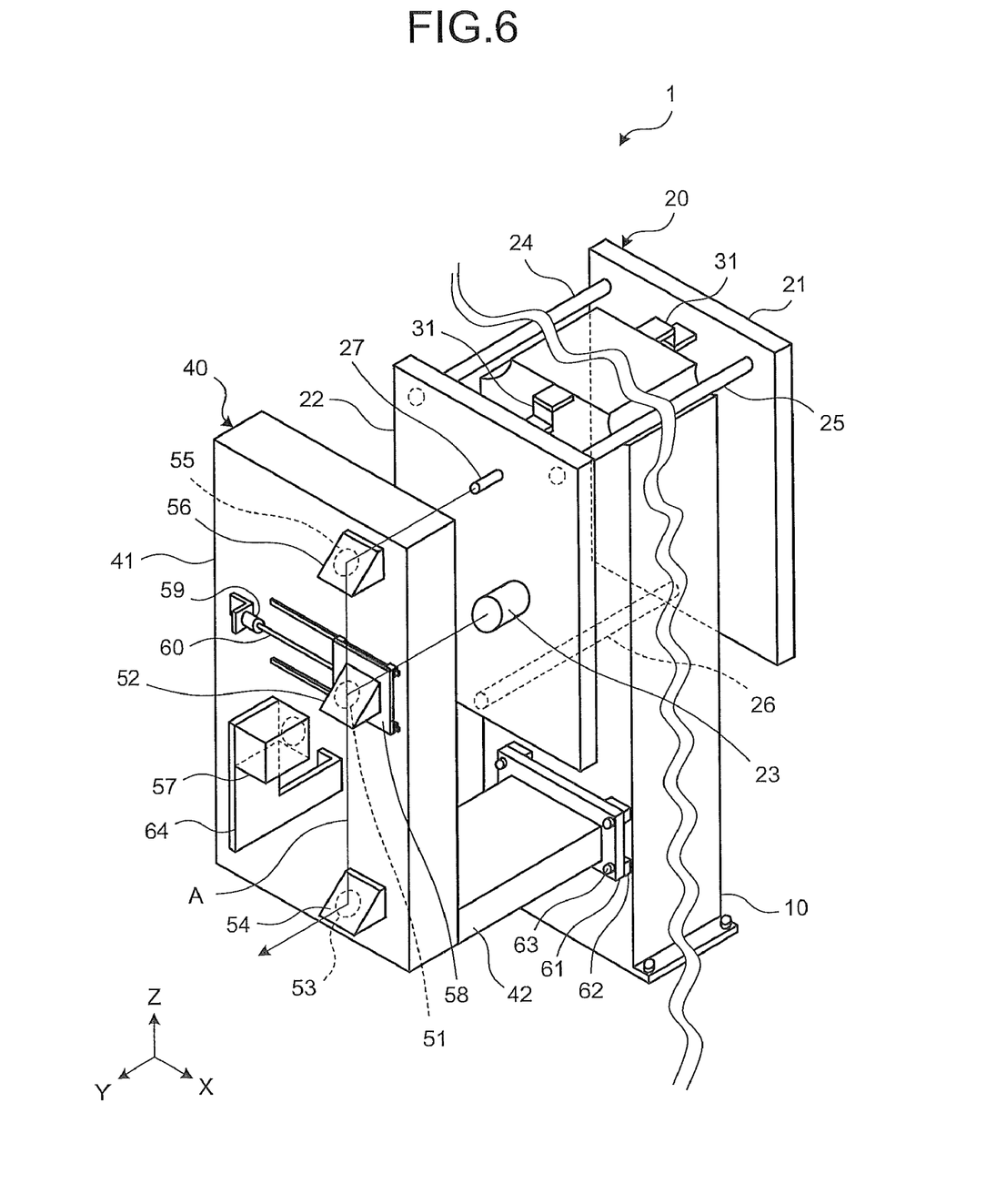
FIG. 6 is a perspective view of a configuration of essential parts of the laser oscillator according to a third embodiment of the present invention.

FIG. 6 is a perspective view of a configuration of essential parts of the laser oscillator according to a third embodiment of the present invention. In the laser oscillator 1 according to the third embodiment, the position of resonator mirrors (the total reflecting mirror and the partial reflecting mirror 23) of the optical resonator 20, which emits the laser light for a processing, is interchanged with the position of the guide light source 27 that emits the guide light. Accordingly, the arrangement positions of the optical components in the optical-component supporting unit 40 are also adjusted.

That is, in the optical resonator 20, the partial reflecting mirror 23 that reflects the laser light is arranged substantially near the center of the height direction (Z-axis direction) of the second optical base 22. The guide light source 27 is arranged above the partial reflecting mirror 23. The total reflecting mirror is arranged on the first optical base 21 and facing the partial reflecting mirror 23 on the second optical base 22.

Corresponding to the position of the partial reflecting mirror 23, the circularly-polarizing mirror 51 is moved to a position on the component installation unit 41 of the optical-component supporting unit 40 that lies on the optical axis of the optical resonator 20. Moreover, the circularly-polarizing mirror 51 is arranged on the movable stage 58 that is movable in the X-axis direction. Along the optical axis of the optical resonator 20 and subsequent to the circularly-polarizing mirror 51 is arranged the optical damper 57 that absorbs the laser light emitted from the optical resonator 20 when the circularly-polarizing mirror 51 is retracted away from the optical axis by moving the movable stage 58. The optical damper 57 is fixed to the component installation unit 41 with an optical-damper supporting member 64.

To the component installation unit 41 is fixed the deflecting block 56 that is equipped with the guide-light deflecting mirror 55 for guiding the guide light emitted from the guide light source 27, which is arranged on the second optical base 22, to the processing head. The guide-light deflecting mirror 55 is arranged to reflect the guide light emitted from the guide light source 27 downward in the Z-axis direction over the optical path A, which is the optical path between the circularly-polarizing mirror 51 and the processing head via the deflecting mirror 53 arranged beneath the circularly-polarizing mirror 51.

The determination of whether to perform processing or adjustment depends On the position of the circularly-polarizing mirror 51 arranged on the movable stage 58. That is, when the circularly-polarizing mirror 51 lies on the optical axis of the optical resonator 20, the laser light emitted from the optical resonator 20 is guided to the processing head, not shown, for processing by the circularly-polarizing mirror 51 and the deflecting mirror 53. On the other hand, when the circularly-polarizing mirror 51 is retracted away from the optical axis, the laser light emitted from the optical resonator 20 is absorbed by the optical damper 57 arranged subsequently on the same optical axis. Thus, the laser light is not guided to the processing head. In that condition, if the guide light source 27 emits the guide light, it is guided over the optical path toward the processing head via the deflecting mirror 53.

Meanwhile, it is also possible to implement the configuration according to the second embodiment to the laser oscillator 1 having the configuration according to the third embodiment. Moreover, the components in the third embodiment identical to those described in the first embodiment are referred to by the same reference numerals and their description is not repeated. Furthermore, because the working and operations of the laser oscillator 1 according to the third embodiment are identical to those described in the first embodiment, the corresponding description is not repeated. Moreover, the third embodiment also enables to achieve the effect identical to that achieved by the first embodiment.

Meanwhile, the arrangements of the circularly-polarizing mirror 51, the deflecting mirror 53, and the guide-light deflecting mirror 55 on the optical-component supporting unit 40 according to the three embodiments are given as examples and are not limited to the same.

Moreover, although the circularly-polarizing mirror 51 and the deflecting mirror 53 are used in all of the three embodiments, it is also possible to replace the circularly-polarizing mirror 51 and the deflecting mirror 53 by dichroic mirrors and achieve the effect identical to that achieved by each of the three embodiments.

Furthermore, to absorb the light reflected at the processing point, the circularly-polarizing mirror 51 and the deflecting mirror 53 can be replaced by polarized-light absorbing mirrors and still achieve the effect identical to that achieved by each of the three embodiments.

INDUSTRIAL APPLICABILITY

As described above, a laser oscillator according to the present invention is suitable for a laser processing apparatus that performs a processing with the use of a laser light emitted by a laser oscillator of orthogonal excitation type.

The invention claimed is:

1. A laser oscillator comprising:
   an oscillator housing;
   a pair of optical bases including a first optical base on which a high-reflection mirror is arranged and a second optical base on which a partial-reflection mirror is arranged, the optical bases being arranged on both sides of the oscillator housing, respectively, and mutually connected in parallel to each other by three supporting rods extending along an optical axis of an optical resonator composed of the high-reflection mirror and the partial-reflection mirror;
   a pair of bellows that connect gaps between the optical bases and the oscillator housing;
   a leaf spring that maintains the optical bases hanging from the oscillator housing;
   a guide light source that emits a guide light for aligning optical components in an optical path from the partial reflecting mirror from which a laser light is emitted to a processing head that illuminates a target object with the laser light and adjusting a processing point on the target object; and
   an optical-component supporting unit that includes optical components that guide the laser light in a direction perpendicular to the optical axis, wherein
   the guide light source is arranged on the second optical base.

2. The laser oscillator according to claim 1, wherein
   the optical-component supporting unit includes
   a first mirror that reflects the laser light in a first predetermined direction,
   a second mirror that reflects the guide light in the first predetermined direction, and
   a third mirror that reflects the laser light reflected at the first mirror or the guide light reflected at the second mirror to a second predetermined direction, and
   the first mirror, the second mirror, and the third mirror are arranged in a mutually-parallel and collinear manner.

3. The laser oscillator according to claim 2, wherein, either one of the first mirror and the second mirror arranged at a center is movable between a first position on the optical path and a second position retracted from the optical path.

4. The laser oscillator according to claim 3, wherein
   the guide light source is arranged lower than the optical resonator and the second mirror is arranged at the center, and
   the laser oscillator further comprises an optical damper that is arranged between the first mirror and the second mirror and that absorbs the laser light when the second mirror is at the first position.

5. The laser oscillator according to claim 3, wherein
the optical resonator is arranged lower than the guide light source and the first light is arranged at the center, and
the laser oscillator comprises an optical damper that absorbs the laser light when the first mirror is at the second position.

6. The laser oscillator according to claim 1, wherein the optical-component supporting unit is fixed to the oscillator housing with three non-collinear fixing members.

7. The laser oscillator according to claim 1, further comprising a mount that supports the oscillator housing and the optical-component supporting unit at their bottoms, wherein the optical-component supporting unit is fixed to the mount with three non-collinear fixing members.

* * * * *